United States Patent Office 3,639,478
Patented Feb. 1, 1972

3,639,478
N,N-ALKYLENEBIS[2-LOWER ALKOXY) - 2-SUB-STITUTED-ALKANAMIDINES] AND THEIR PREPARATION
Denis M. Bailey, Greenbush, N.Y., assignor to Sterling Drug Inc., New York, N.Y.
No Drawing. Filed June 24, 1968, Ser. No. 739,193
Int. Cl. C07c *123/00*
U.S. Cl. 260—564 R          6 Claims

ABSTRACT OF THE DISCLOSURE

A 2 - (lower - alkoxy)-2-phenylalkanamidine, having hypoglycemic activity, or an N,N''-alkylenebis[2-(lower-alkoxy) - 2 - phenylalkanamidine], having antibacterial activity, are respectively prepared by reacting a lower-alkyl 2-(lower-alkoxy) - 2 - phenylalkanimidate with a monoamine or diamine or by reacting a 2-(lower-alkoxy)-2-phenylalkanenitrile with two molar equivalent quantities of a monoamine. The intermediate lower-alkyl 2-(lower-alkoxy)-2-phenylalkanimidate as the hydrohalide is prepared by reacting the corresponding 2-(lower-alkoxy)-2-phenylalkanenitrile with a lower-alkanol in the presence of ethereal hydrogen halide. The intermediate 2-(lower-alkoxy)-2-phenylalkanenitrile is prepared preferably by first reacting a benzaldehyde with a tri-(lower-alkyl) orthoformate to form the aldehyde di-(lower-alkyl) acetal, reacting the latter with an acyl halide to form the corresponding α-halobenzyl lower-alkyl ether and reacting said ether with an alkali cyanide to yield said intermediate nitrile.

This invention relates to compositions of matter known in the art of chemistry as 2-phenylalkanamidines and to their preparation.

The invention in its composition aspect resides in the compounds having the Formula I or II.

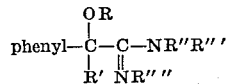

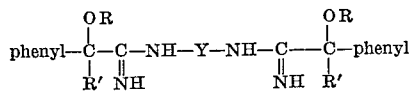

where R is lower-alkyl; R' is hydrogen, lower-alkyl or lower-alkenyl; R'' and R'''' are each hydrogen or lower-alkyl; R''' is lower-alkyl, lower-cycloalkyl, benzyl, phenethyl, tetrahydrofurfuryl or lower-alkoxyalkyl, or, R'' and R''' taken with N represent a saturated N-heteromonocyclic radical having from 5 to 7 ring atoms; and, Y is alkylene of 2–12 carbon atoms. The compounds of this composition aspect of the invention having Formula I, when tested according to standard pharmacological evaluation procedures in animals, have been found to possess the inherent applied use characteristics of having hypoglycemic activity. The compounds of this composition aspect of the invention having Formula II, when tested according to standard bacteriological evaluation procedures, have been found to possess the inherent applied use characteristics of having antibacterial activity.

The substitution of simple moieties on the benzene ring of phenyl in the compounds of the invention does not adversely affect the pharmaceutical activity of the compounds. Illustrative but not limitative examples of such moieties are lower-alkyl, lowre-alkoxy, halo, trihalomethyl, lower-alkylmercapto, lower-alkylsulfonyl, di-(lower-alkyl)amino, amino, hydroxy, nitro and benzyloxy. Such substituent moieties can be in any available position of the benzene ring and where more than one, preferably no more than three, can be in any position relative to one another. Also, phenyl in the compounds of the invention can be replaced by other simple ring moieties without affecting the pharmaceutical activity of the compounds. Illustrative but not limitative examples of such other simple ring moieties are naphthyl, indanyl, biphenylyl, cyclohexenyl and cyclohexyl.

The terms "lower-alkyl" and "lower-alkoxy," as used herein, respectively preferably have alkyl and alkoxy radicals having from one to six carbon atoms which can be arranged as straight or branched chains, among which are, for purposes of illustration but without limiting the generality of the fore-going, methyl, ethyl, n-propyl, isopropyl, sec-butyl, isobutyl and n-hexyl for lower-alkyl; and, by methoxy, ethoxy, n-propoxy, isopropoxy, isobutoxy, n-amoxy and n-hexoxy for lower-alkoxy.

The term "lower-alkenyl," as used herein, preferably are alkenyl radicals having from three to six carbon atoms, among which are, for purposes of illustration but without limiting the generality of the foregoing, 2-propenyl (allyl), 2-butenyl, 2-methyl-2-propenyl, 2-hexenyl, and the like.

The term "lower-cycloalkyl," as used herein, preferably are cycloalkyl radicals having from three to six ring carbon atoms, illustrated by cyclopropyl, cyclobutyl, cyclopentyl and cyclohexyl.

The term "lower-alkoxyalkyl," as used herein preferably are alkoxyalkyl radicals having from three to six carbon atoms, illustrated by 2-methoxyethyl, 3-methoxypropyl, 2-ethoxyethyl, 3-ethoxypropyl, 2-ethoxypropyl, 2-n-propoxyethyl, 3-isopropoxyphenyl, 4-methoxybutyl, 5-methoxypentyl, 4-ethoxybutyl and the like.

When NR''R''' of Formula I represents (lower-alkylated)-N-heteromonocyclic radicals, lower-alkyl radicals can be attached to any available ring-atom and can vary preferably from one to three in number, e.g., 2-methylpiperidino, 3-ethylpiperidino, 4-methylpiperidino, 2,6-dimethylpiperidino, 2,4-dimethylpiperidino, 2,4,6-trimethylpiperidino, 3-n-propylpiperidino, 2,2-dimethylpiperidino, 2-methylpyrrolidino, 2,5-dimethylpyrrolidino, 2,3-dimethylmorpholino, 2-ethylmorpholino, 2-methylhexamethyleneimino, 2,7-dimethylhexamethyleneimino, 4-methylpiperazino, 3-ethylpiperazino, 2,4,6-trimethylpiperazino, and the like.

The term "alkylene of two to twelve carbon atoms," as used herein, e.g., as represented by Y in Formula II, preferably are alkylene radicals having from two to twelve carbon atoms and having its connecting linkage on different carbon atoms, illustrated by

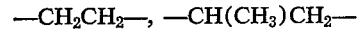

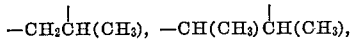

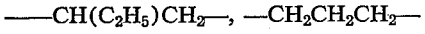

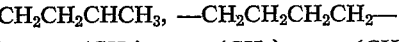

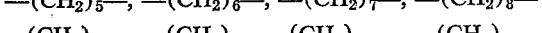

and the like.

The invention sought to be patented in its process aspect, is described as residing in the process of the preparation of the composition aspect of the invention, that is, the compound of Formula I or II which comprises reacting a lower-alkyl-2-(lower-alkoxy)-2-phenylalkanimidate of the formula

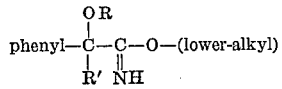

with an amine of the Formula IV

to form the compound of Formula I or with a diamine of the formula V $$H_2N-Y-NH_2 \qquad V$$

to form the compound of Formula II.

Another process aspect of the invention resides in the process of preparing a compound of Formula I where $R''$ is hydrogen, and $R'''$ and $R''''$ are each lower-alkyl which comprises reacting a 2-(lower-alkoxy)-2-phenylalkanenitrile of the Formula VI

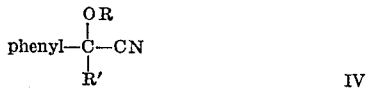

with two molar equivalents of a lower-alklyamine.

Compounds of Formula I where $R''''$ is lower-alkyl and is not the same as $R'''$ are prepared by reacting a 2-(lower-alkoxy)-2-phenylalkanecarboxamide of the Formula VII

where R and $R''''$ are each lower-alkyl, alike or different, and R' is hydrogen, lower-alkyl or lower-alkenyl, with a tri-(lower-alkyl)oxonium tetrafluoroborate, preferably triethyloxonium tetrafluoroborate or trimethyloxonium tetrafluoroborate, the former having the Formula VIII $$(C_2H_5O)_3{}^+BF_4{}^- \qquad VIII$$

to form the corresponding lower-alkyl 2-(lower-alkoxy)-2-phenyl-N-$R''''$-alkanimidate tetrafluoroborate salt of the Formula IIIa for the ethyl ester

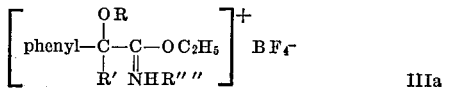

which is then reacted with an amine of the Formula IV

where $R''$ and $R'''$ have the meanings given above for Formula I. The intermediate compounds of Formula VII are generally known and are prepared by conventional methods.

The final products of Formulas I and II are useful in the free base form or in the form of their acid-addition salts, and both forms are within the purview of the invention, and are considered to be one and the same invention. The acid-addition salts are simply a more convenient form for use; and, in practice, use of the salt form inherently amounts to use of the base form. The acids which can be used to prepared the acid-addition salts are preferably those which produce, when combined with the free base, pharmaceutically acceptable salts, that is, salts whose anions are relatively innocuous to the animal organism in pharmaceutical doses of the salts, so that the beneficial properties inherent in the free base are not vitiated by side effects ascribable to the anions; in other words, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, p-toluenesulfonic acid, naponic acid (1,4-naphthalenedisulfonic acid), and the like, giving the hydrochloride, hydrobromide, hydriodide, nitrate, phosphate, sulfamate, sulfate, methanesulfonate, ethanesulfonate, benzenesulfonate, p-toluenesulfonate and naponate, respectively.

The acid-addition salts are prepared preferably by reacting the free base and acid in an organic solvent, .e.g, ethanol, 2-propanol, acetone, etc., in which case the salt separates directly or can be obtained by concentration of the solution.

The nature of the starting materials, mode of synthesis, results of elementary analyses, examination of the final products of Formulas I and II by infrared and nuclear magnetic resonance spectrographic analyses, all taken together, confirm the molecular structure assigned to these compounds.

The manner and process of making and using the invention will now be generally described so as to enable a person skilled in the art of medicinal chemistry to make and use the same, as follows:

PREPARATION OF INTERMEDIATES

The intermediate 2-(lower-alkoxy)-2-phenylalkane-nitriles (Formula VI), representative examples of which are known, e.g., 2-ethoxy-2-phenylethanenitrile (or α-ethoxyphenylacetonitrile), 2-methoxy-2-phenylethanenitrile and 2-ethoxy-2-(4-methoxyphenyl)ethanenitrile, are prepared by generally known methods. For example, one method found convenient utilized three steps by first reacting the corresponding generally known benzaldehydes with a tri-(lower-alkyl) orthoformate of the Formula $HC(OR)_3$ to form the corresponding aldehyde di-(lower-alkyl) acetal of the formula phenyl-$(CH(OR))_2$, which is then reacted with a lower-alkanoyl halide, e.g., acetyl chloride, to form the corresponding α-halobenzyl lower-alkyl ether of the formula phenyl-CHCl(OR) which in turn is reacted with an alkali cyanide, e.g., sodium cyanide, to yield the α-(lower-alkoxy) phenylacetonitrile of the formula phenyl-CH(OR)CN, that is, the compound of Formula VI where R' is hydrogen. Reaction of this compound with a lower-alkylating agent, e.g., a lower-alkyl halide, in the presence of a strong base, e.g., potassium tertiary-butoxide, sodamide, etc., yields the compound of Formula VI where R' is lower-alkyl.

The compounds of Formula VI where R' is hydrogen also can be prepared by the generally known method of heating the corresponding α-(lower-alkoxy)phenylacetamide of the formula phenyl-CH(OR)CONH$_2$ with a dehydrating agent effective to convert carboxamides to nitriles, e.g., thionyl chloride. Said α-(lower-alkoxy)phenylacetamides are prepared from the corresponding generally known α-(lower-alkoxy)phenylacetic acids by the generally known procedures of converting said acids to their acid chlorides by reaction with thionyl chloride and reacting said acid chlorides with ammonia to form said carboxamides.

The intermediate lower-alkyl 2-(lower-alkoxy)-2-phenylalkanimidates of Formula III are prepared by reacting the corresponding 2-(lower-alkoxy)-2-phenylalkanenitriles of Formula VI with a lower-alkanol in the presence of a hydrogen halide at a temperature below about 10° C. The reaction is carried out preferably at about 0° C. using ethanol as the lower-alkanol and slowly bubbling hydrogen chloride into a cold solution of the 2-(lower-alkoxy)-2-phenylalkanenitrile in ethanol and ether as a solvent until the reaction mixture is saturated.

The intermediate amines of Formulas IV and V are known compounds which are either commercially available or readily prepared by conventional means.

PREPARATION OF FINAL PRODUCTS

The final products, as illustrated by Formulas I or II, are prepared by reacting a lower-alkyl-2-(lower-alkoxy)-2-phenylalkaneimidate with an amine of Formula IV to form the compound of Formula I or with a diamine of Formula V to form the compound of Formula II. The reaction is preferably carried out at about room temperature, i.e., 25°–30° C., under anhydrous conditions, preferably in a suitable solvent, e.g., a lower-alkanol such as ethanol. The reaction with the diamine of Formula V is facilitated by the presence of a strong base, e.g., an alkali lower-alkoxide such as sodium methoxide.

The final product of Formula I where R″ is hydrogen, and R‴ and R″″ are each lower-alkyl are conveniently prepared by reacting a 2-(lower-alkoxy)-2-phenylalkanenitrile of Formula VI with two molar equivalents of a lower-alkylamine in the presence of a catalytic amount of carbon disulfide or hydrogen sulfide. This reaction is carried out by heating the reactants in the presence of the sulfide catalyst at about 70°–200° C., preferably between about 70° and 125° C. Optionally, this reaction can be run under pressure, thereby reducing the time required of completion of reaction.

In the preparation of the compounds of Formula I where R‴ and R″″ are different, the 2-(lower-alkoxy)-2-phenylalkanecarboxamide of Formula VII is first reacted, preferably in a suitable solvent, e.g., methylene dichloride, with a tri-(lower-alkyl)oxonium tetrafluoroborate, preferably triethyloxonium tetrafluoroborate or trimethyloxonium tetrafluoroborate, e.g., of Formula VIII for the former compound, to form the corresponding lower-alkyl-2-(lower-alkoxy)-2-phenyl-N-R″″-alkanimidate tetrafluoroborate salt of Formula IIIa. This reaction is conveniently carried out by stirring the reactants at room temperature for about fifteen to twenty hours. The resulting salt of Formula IIIa is then stirred at room temperature in a lower-alkanol, e.g., ethanol, with an excess of the appropriate amine of Formula IV and the reaction mixture is then made basic, e.g., with aqueous sodium hydroxide solution, to liberate the product of Formula I where R‴ and R″″ are different.

The best mode contemplated for carrying out the invention will now be set forth as follows:

(A) ALDEHYDE DI-(LOWER-ALKYL) ACETALS (1) Benzaldehyde diethyl acetal.—A mixture containing 106 g. of benzaldehyde, 161 g. of triethyl orthoformate, 138 g. of ethanol and 2 g. of finely powdered ammonium chloride was refluxed on a steam bath for fifteen minutes; the excess reactants were then distilled off at about 85° C.; and the remaining material was distilled in vacuo. After a fore-run of ethyl orthoformate (B.P., 40–60° C. at 10 mm.), 160 g. of benzaldehyde diethyl acetal was collected at 97–99° C./10 mm.

(2) 1-naphthaldehyde dimethyl acetal.—To 134 g. of 1-naphthaldehyde in a one liter round bottom flask was added successively 120 g. of trimethyl orthoformate, 120 ml. of methanol and two drops of concentrated hydrochloric acid. After the initial vigorous reaction had subsided, the solution was refluxed for thirty minutes and then the excess reagents were removed by distilling under reduced pressure. The residue was distilled in vacuo to yield 160 g. of 1-naphthaldehyde dimethyl acetal, B.P. 94° C. at 0.12 mm.

(3) 2,6-dichlorobenzaldehyde diethyl acetal.—143 g., was prepared by stirring a mixture containing 100 g. of 2,6-dichlorobenzaldehyde, 90 g. of triethyl orthoformate, 90 ml. of ethanol and 0.5 ml. of concentrated hydrochloric acid for forty-five minutes at room temperature (25–30° C.), for forty-five minutes on a steam bath and then one hour at room temperature, followed by removal of the excess reactants by distilling in vacuo at 70° C. using a water pump. The product was used in the next step without any further purification.

(4) 2-chlorobenzaldehyde diethyl acetal.—835 g., as a clear pale yellow oil, was prepared as in Example A–3 using 500 g. of 2-chlorobenzaldehyde.

(5) 4-chlorobenzaldehyde diethyl acetal.—168.5 g., B.P. 126–129° C. at 15 mm., was prepared by refluxing for thirty minutes a mixture containing 140.6 g. of 4-chlorobenzaldehyde, 178 g. of triethyl orthoformate, 175 ml. of ethanol and 1 ml. of concentrated hydrochloric acid; distilling off in vacuo (at 90° C. using a water pump) the solvent and excess reactants; and, distilling the residue under high vacuum.

(6) Indane-5-carboxaldehyde diethyl acetal.—281 g., B.P. 139–140° C. at 9 mm., was prepared as in Example A–5 using 200 g. of indane-5-carboxaldehyde.

(7) 1-naphthaldehyde diethyl acetal.—197 g., B.P. 100–101 at 0.16–0.17 mm., was prepared as in Example A–2 using 156.2 g. of 1-naphthaldehyde.

(8) 3-fluorobenzaldehyde diethyl acetal.—140.8 g. B.P. 91–95° C. at 10 mm., was prepared as in Example A–5 using 124 g. of 3-fluorobenzaldehyde.

(9) 4-isopropylbenzaldehyde diethyl acetal.—198.1 g., was prepared as in Example A–3 using 148 g. of 4-isopropylbenzaldehyde.

(10) 4-methoxybenzaldehyde diethyl acetal.—422 g., was prepared as in Example A–9 using 242 ml. of 4-methoxybenzaldehyde (anisic aldehyde).

(11) Benzaldehyde dimethyl acetal.—146.2 g., B.P. 98–103° C. at 31–37 mm., was prepared as in Example A–5 using 106.1 g. of benzaldehyde.

(12) 4-methylbenzaldehyde diethyl acetal.—387 g., was prepared as in Example A–3 using 240 g. of 4-methylbenzaldehyde.

(13) 2-naphthaldehyde diethyl acetal.—102.4 g., B.P. 105–108° C. at 0.02 mm., was prepared as in Example A–5 using 90 g. of 2-naphthaldehyde.

(14) 3,4-dichlorobenzaldehyde diethyl acetal.—A mixture containing 175 g. of 3,4-dichlorobenzaldehyde, 178 g. of triethyl orthoformate, 100 ml. of absolute ethanol and 100 ml. of 5% ethanolic hydrogen chloride solution was stirred under reflux for thirty minutes. The reaction mixture was then cooled and neutralized with sodium ethoxide solution prepared from 2.3 g. of sodium and 100 ml. of aboslute ethanol. The solvent was distilled off in vacuo; the residue was cooled in an ice bath and diluted with 300 ml. of benzene; and, the resulting mixture was poured into 200 ml. of cooled 10% aqueous hydroxide solution. The benzene layer was separated, washed with 200 ml. of water, dried over anhydrous sodium sulfate, filtered through anhydrous sodium sulfate and heated on a steam bath in vacuo to remove any solvent. The residue was then distilled in vacuo to yield a 201.7 g. fraction of 3,4-dichlorobenzaldehyde diethyl acetal, B.P. 73–88° C. at 0.185–0.310 mm.

(15) Benzaldehyde di-n-propyl acetal.—A mixture containing 210 g. of benzaldehyde dimethyl acetal, 1 liter of n-propanol and 1 drop of concentrated hydrochloric acid was fractionally distilled through a 9″ column packed with glass helices. After removing the methanol at atmospheric pressure, then removing the excess n-propanol using a rotary evaporator, the product, benzaldehyde di-n-propyl acetal B.P. 242–245° C., was distilled at atmospheric pressure.

(16) Benzaldehyde di-n-butyl acetal.—247.3 g., B.P. 112–115° C. at 1.7 mm., was prepared using the procedure of Stewart et al. [JACS 77, 1098 (1955)] using 202 ml. of benzaldehyde, 600 ml. of n-butanol and two drops of concentrated hydrochloric acid.

(17) 2-methoxybenzaldehyde diethyl acetal.—105 g., was prepared as in Example A–3 using 65 g. of 2-methoxybenzaldehyde.

(18) 4-benzyloxybenzaldehyde diethyl acetal.—To a suspension containing 100 g. of 4-benzyloxybenzaldehyde, 90 g. of triethyl orthoformate and 250 ml. of absolute ethanol was added 1 ml. of concentrated hydrochloric acid. After allowing the reaction mixture to stand for one hour at about 25–30° C., 30 g. of solid potassium carbonate was added and the resulting mixture was stirred for five minutes and filtered. The filtrate was evaporated in vacuo to yield 135 g. of 4-benzyloxybenzaldehyde diethyl acetal.

(19) 3-cyclohexenealdehyde diethyl acetal.—To a stirred solution containing 128.5 g. of 3-cyclohexenealdehyde (1,2,3,6-tetrahydrobenzaldehyde) and 250 ml. of absolute ethanol was added successively a few mg. of p-toluenesulfonic acid and 220 ml. of triethyl orthoformate, the latter at such a rate to maintain the reaction temperature at about 38° C. (aided by cooling in an ice bath). The reaction mixture was stirred at room temperature for seventeen hours, warmed on a steam bath to reflux (reaction temperature 78° C.) for two hours, cooled and distilled in vacuo to remove the ethanol and excess triethyl orthoformate. The remaining viscous yellow oily residue was dissolved in 500 ml. of ether and the solution extracted successively with 10% aqueous sodium hydroxide solution three times and then with water. The ether solution was then dried over anhydrous magnesium sulfate and the ether removed by distilling in vacuo, thereby yielding 208 g. of 3-cyclohexenealdehyde diethyl acetal.

(20) 3-fluoro-4-methoxybenzaldehyde diethyl acetal.—192 g., was prepared as in Example A-3 using 122 g. of 3-fluoro-4-methoxybenzaldehyde.

(B) ALPHA-HALOBENZYL LOWER-ALKYL ETHERS (1) α-chlorobenzyl ethyl ether.—A mixture containing 157 g. of benzaldehyde diethyl acetal, 180 g. of acetyl chloride and 1.5 ml. of thionyl chloride was stirred at room temperature (25–30° C.) overnight (about fifteen hours). The volatile liquids (excess acetyl chloride and ethyl acetate) were removed under reduced pressure and the residue was fractionated in vacuo to yield 139.5 g. of α-chlorobenzyl ethyl ether, B.P. 58–60° C. at 0.2 mm.

(2) α,3,4-trichlorobenzyl ethyl ether.—218.2 g., was prepared as in Example B-1 using 229.5 g. of 3,4-dichlorobenzaldehyde diethyl acetal, 393 ml. of acetyl chloride and 3.5 ml. of thionyl chloride. The ether, not distilled, was obtained after removal of volatile liquids from the reaction mixture and heating the residue at 100° C. and 0.07 mm.

(3) 1-naphthylchloromethyl methyl ether.—A mixture containing 160 g. of 1-naphthaldehyde dimethyl acetal and 280 ml. of acetyl chloride in a flask equipped with a reflux condenser and a calcium chloride tube was allowed to stand at room temperature overnight. The excess acetyl chloride and the methyl acetate formed during the reaction were removed in vacuo at 30° C. to yield 160 g. of 1-naphthylchloromethyl methyl ether.

(4) α-Chlorobenzyl methyl ether.—131.7 g., was prepared as in Example B-3 using 146.2 g. of benzaldehyde dimethyl acetal and 408 ml. of acetyl chloride.

(5) α,4-dichlorobenzyl ethyl ether.—To a stirred mixture containing 280 ml. of acetyl chloride and 2 ml. of thionyl chloride was added dropwise at about 30° C. 168.5 g. of 4-chlorobenzaldehyde diethyl acetal over a period of about forty minutes. The reaction mixture was then allowed to stand overnight at room temperature. The solvent was removed in vacuo at a temperature below 40° C. and then the residue was heated in vacuo at 50° C. for about thirty minutes to yield 152 g. of α,4-dichlorobenzyl ethyl ether.

(6) α,2,6-trichlorobenzyl ethyl ether, 139 g., was prepared as in Example B-5 using 143 g. of 2,6-dichlorobenzaldehyde diethyl acetal, 200 ml. of acetyl chloride and 100 ml. of thionyl chloride. A 15 g. sample distilled at 82–83° C. at 0.06 mm.

(7) α,2-dichlorobenzyl ethyl ether.—826 g., was prepared as in Example B-5 using 835 g. of 2-chlorobenzaldehyde diethyl acetal, 1260 ml. of acetyl chloride and 2 ml. of thionyl chloride.

(8) α-Chloro-3-fluorobenzyl ethyl ether.—To 330 ml. of acetyl chloride containing 1 ml. of ethanol was added dropwise with stirring over a period of about one hour 184 g. of 3-fluorobenzaldehyde diethyl acetal, keeping the temperature between about 25–30° C. by intermittent cooling with an ice bath. The solution was allowed to stand overnight at room temperature and then heated in vacuo below 40° C. to remove the excess acetyl chloride and ethyl acetate. The residue was then heated in vacuo at 50° C. for an hour to yield 175 g. of α-chloro-3-fluorobenzyl ethyl ether.

(9) α-Chloro-4-methoxybenzyl ethyl ether.—401 g., was prepared as in Example B-8 using 422 g. of 4-methoxybenzaldehyde diethyl acetal, 357 ml. of acetyl chloride and 1 ml. of ethanol.

(10) α-Chloro-2-naphthylmethyl ethyl ether.—101 g., was prepared as in Example B-8 using 106 g. of 2-naphthaldehyde diethyl acetal and 82 ml. of acetyl chloride.

(11) α-Chloro-1-naphthylmethyl ethyl ether.—187 g., was prepared as in Example B-8 but using 2 ml. of thionyl chloride together with 350 ml. of acetyl chloride and 196.5 g. of 1-naphthaldehyde diethyl acetal.

(12) α-Chloro-4-isopropylbenzyl ethyl ether.—189 g., was prepared as in Example B-8 using 198 g. of 4-isopropylbenzaldehyde diethyl acetal, 160 ml. of acetyl chloride and 1 ml. of ethanol.

(13) α-Chlorobenzyl n-propyl ether.—92.4 g., was prepared as in Example B-8 using 104 g. of benzaldehyde di-n-propyl acetal and 178 ml. of acetyl chloride.

(14) α-Chlorobenzyl n-butyl ether.—198 g., was prepared as in Example B-8 using 236 g. of benzaldehyde di-n-butyl acetal, 178 ml. of acetyl chloride and a few drops of ethanol.

(15) α-Chloro-4-methylbenzyl ethyl ether.—185 g., was prepared as in Example B-8 using 194 g. of 4-methylbenzaldehyde diethyl acetal, 284 ml. of acetyl chloride and 3 ml. of thionyl chloride.

(16) α-Chloro-5-indanylmethyl ethyl ether.—104 g., was prepared as in Eample B-8 using 281 g. of indane-5-carboxaldehyde diethyl acetal and 400 ml. of acetyl chloride.

(17) α-Chloro-2-methoxybenzyl ethyl ether.—96 g. was prepared as in Example B-5 using 105 g. of 2-methoxybenzaldehyde diethyl acetal, 160 ml. of acetyl chloride and 1 ml. of thionyl chloride.

(18) 4-benzyloxy-α-chlorobenzyl ethyl ether was prepared as in Example B-8 using 135 g. of 4-benzyloxybenzaldehyde diethyl acetal, 106 ml. of acetyl chloride and 1 ml. of thionyl chloride.

(19) α-Chloro-1,2,3,6-tetrahydrobenzyl ethyl ether.—156 g., was prepared as in Example B-8 using 198 g. of 1,2,3,6-tetrahydrobenzaldehyde diethyl acetal, 700 ml. of acetyl chloride and 1 ml. of thionyl chloride.

(20) α-Chloro-3-fluoro-4-methoxybenzyl ethyl ether.—176 g., was prepared as in Example B-8 using 192 g. of 3-fluoro-4-methoxybenzaldehyde diethyl acetal, 500 g. of acetyl chloride and 1 ml. of thionyl chloride.

(C) ALPHA - (LOWER-ALKOXY)PHENYLACETONITRILES FROM ALPHAHALOBENZYL LOWER-ALKYL ETHERS (1) α-Ethoxyphenylacetonitrile.—To a suspension containing 37.8 g. of sodium cyanide in 400 ml. of dimethylformamide was added dropwise with stirring over a period of about forty-five minutes, keeping the mixture below 30° C., a solution containing 105 g. of α-chlorobenzyl ethyl ether in 100 ml. of dimethylformamide. The mixture was stirred for an additional thirty minutes; the solids were filtered off; the solvent was distilled off under reduced pressure; and, the residue was fractionally distilled to yield 66 g. of α-ethoxyphenylacetonitrile, B.P. 114–116° C. at 10 mm.

(2) α - Ethoxy-2,6-dichlorophenylacetonitrile.—63 g., B.P. 97° C. at 0.05 mm., was prepared as in Example C-1 using 36 g. of sodium cyanide suspended in 250 ml. of dimethylformamide and 124 g. of α,2,6-dichlorobenzyl ethyl ether and 40 ml. of dimethylformamide. Before distillation, infusorial earth was added to the reaction mixture; the mixture was filtered; and the filter cake was washed with benzene; and, the filtrate was evaporated on a rotary evaporator, removing the last of the dimethylformamide through a fractionating column using a water pump.

(3) α-Ethoxy - 2 - chlorophenylacetonitrile.—To a stirred suspension containing 204 g. of sodium cyanide in 1500 ml. of dimethylformamide was added over a period of about two hours, keeping the reaction mixture at about 20–25° C., 676 g. of α,2-dichlorobenzyl ethyl ether and the resulting mixture was stirred for an additional hour. To the reaction mixture was added 800 ml. (dry volume) of infusorial earth and the mixture was filtered through infusorial earth. The filter pad was washed with benzene. The combined filtrate and washings were evaporated in vacuo at about 20–40 mm. and 70° C. The residue was taken up with 1500 ml. of 1:1 benzene-ether and the resulting solution treated with 2 liters of ice water containing 200 ml. of 10% aqueous sodium hydroxide solution. The aqueous layer was drained off and discarded. The organic layer was washed with two 500 ml. portions of water and with 250 ml. portions of brine, and then dried overnight over anhydrous sodium sulfate. The solvent was distilled off in vacuo and the residue fractionally distilled to yield 379.2 g. of α-ethoxy-2-chlorophenylacetonitrile, B.P. 93–97° C. at 1.4 mm.

(4) α-Ethoxy - 4 - chlorophenylacetonitrile.—88.5 g., B.P. 103–105° C. at 1.3 mm., was prepared as in Example C–2 using 49 g. of sodium cyanide in dimethylformamide and 152 g. of α,4-dichlorobenzyl ethyl ether.

(5) α-Methoxy-1-naphthylacetonitrile.—68 g., B.P. 124–126° C. at 0.27–0.28 mm., was prepared as in Example C–3 using 49 g. of sodium cyanide in 500 ml. of dimethylformamide and 160 g. of α-chloro-1-naphthylmethyl methyl ether in 250 ml. of dimethylformamide.

(6) α-Ethoxy-3,4-dichlorophenylacetonitrile.—24.5 g. at 78–90° C. and 0.015–0.025 mm. and 14.9 g. at 100–108° C. and 0.05 mm., was prepared as in Example C–1 using 50.5 g. of sodium cyanide suspended in 545 ml. of dimethylformamide and 198.2 g. of α,3,4-trichlorobenzyl ethyl ether in 140 ml. of dimethylformamide.

(7) α-Methoxyphenylacetonitrile.—55.5 g., B.P. 59–68.5° C. at 0.03–0.14 mm., was prepared as in Example C–1 using 51.5 g. of sodium cyanide in 553 ml. of dimethylformamide and 131.7 g. of α-chlorobenzyl methyl ether in 141 ml. of dimethylformamide.

(8) α-n-Propoxyphenylacetonitrile.—57.3 g., B.P. 100–103° C. at 2 mm., was prepared as in Example C–3 but using only ether (no benzene) to extract the product and using 30.6 g. of sodium cyanide in 200 ml. of dimethylformamide and 92.4 g. of α-chlorobenzyl n-propyl ether.

(9) α - n - Butoxyphenylacetonitrile.—122.9 g., B.P. 105.5–107.5° C. at 1.5 mm., was prepared as in Example C–8 using 61.2 g. of sodium cyanide in 500 ml. of dimethylformamide and 198 g. of n-butyl α-chlorobenzyl ether.

(10) α-Ethoxy - 3 - fluorophenylacetonitrile.—54.6 g., B.P. 75–78° C. at 0.17 mm., was prepared as in Example C–8 using 57 g. of sodium cyanide in 600 ml. of dimethylformamide and 175 g. of α-chloro-3-fluorobenzyl ethyl ether.

(11) α - Ethoxy-4-methoxyphenylacetonitrile.—299.5 g., B.P. 118–125° C. at 1.5 mm., was prepared as in Example C–8 using 122.5 g. of sodium cyanide in 900 ml. of dimethylformamide and 401 g. of α-chloro-4-methoxybenzyl ether.

(12) α-Ethoxy-2-naphthylacetonitrile.—40.44 g., B.P. 119–121° C. at 0.09 mm., was prepared as in Example C–8 using 28.2 g. of sodium cyanide in 350 ml. of dimethylformamide and 101 g. of α-chloro-2-naphthylmethyl ethyl ether. The product solidified on standing and was found to melt at 52–54° C.

(13) α - Ethoxy-4-isopropylphenylacetonitrile.—109.6 g., B.P. 86–92° C. at 0.10 mm., was prepared as in Example C–8 using 55 g. of sodium cyanide in 400 ml. of dimethylformamide and 189 g. of α-chloro-4-isopropylbenzyl ethyl ether.

(14) α-Ethoxy-1-naphthylacetonitrile.—97.3 g., B.P. 135–139° C. at 0.09–0.12 mm., was prepared as in Example C–8 using 50 g. of sodium cyanide in 850 ml. of dimethylformamide and 182 g. of α-chloro-1-naphthylmethyl ethyl ether.

(15) α - Ethoxy-4-methylphenylacetonitrile.—89 g., 133–135° C. at 9 mm., was prepared as in Example C–8 using 61 g. of sodium cyanide in 300 ml. of dimethylformamide and 172 g. of α-chloro-4-methylbenzyl ethyl ether.

(16) α - Ethoxy-5-indanylacetonitrile.—104 g., B.P. 122–126° C. at 1.4 mm., was prepared as in Example C–8 using 78.5 g. of sodium cyanide in 650 ml. of dimethylformamide and 269.8 g. of α-chloro-5-indanylmethyl ethyl ether. Before fractionating, the reaction mixture was diluted with 1300 ml. of water, the mixture extracted three times with benzene, the extract washed with water, dried over anhydrous potassium carbonate and evaporated in vacuo to remove the benzene.

(17) α-Ethoxy - 2 - methoxyphenylacetonitrile.—B.P. 111–113° C. at 1.3 mm., was prepared as in Example C–8 using 30 g. of sodium cyanide in 250 ml. of dimethylformamide and 96 g. of α-chloro-2-methoxybenzyl ethyl ether.

(18) 4 - benzyloxy-α-ethoxyphenylacetonitrile.—To a stirred mixture containing 30 g. of sodium cyanide in 250 ml. of dimethylformamide was added dropwise over a period of forty-five minutes 4-benzyloxy-α-chlorobenzyl ethyl ether prepared from 135 g. of 4-benzyloxybenzaldehyde diethyl acetal (Example B–18), maintaining the reaction temperature at about 20–25° C. by slight external cooling. The reaction mixture was stirred for an additional three hours, infusorial earth was added and the mixture filtered through infusorial earth. The filter cake was washed successively with dimethylformamide and benzene. The combined filtrate and washings were evaporated to a low volume and was taken up in a mixture of benzene, ether and water. The layers were separated and the organic layer was washed three times with water and then stirred vigorously for one hour with 100 ml. of 1 N hydrochloric acid. The layers were separated and the organic layer was washed with aqueous sodium bicarbonate solution, dried over anhydrous potassium carbonate while treating with decolorizing charcoal, the mixture filtered and the filtrate evaporated in vacuo to remove the ether and benzene. The residue was distilled under reduced pressure to yield 53.7 g. of 4-benzyloxy-α-ethoxyphenylacetonitrile, B.P. 155–158° C. at 0.03–0.04 mm.

(19) α - Ethoxy-3-cyclohexenylacetonitrile.—13.6 g., B.P. 97–99° C., at 8 mm., was prepared as in Example C–3 using 23 g. of sodium cyanide, 400 ml. of dimethylformamide, 80 g. of α-chloro-1,2,3,6-tetrahydrobenzaldehyde ethyl ether and ether instead of benzene-ether in the work-up.

(20) 3-chloro-α-ethoxyphenylacetonitrile.—B.P. 89–91° C. at 0.14 mm., 67.11 g., was prepared as in Example C–8 using 53.9 g. of sodium cyanide, 300 ml. of dimethylformamide and 146 g. of α,3-dichlorobenzyl ethyl ether.

(21) α-Ethoxy - 3 - fluoro - 4-methoxyphenylacetonitrile, B.P. 125–129° C. at 1.4 mm., 81.3 g., was prepared as in Example C–8 using 49 g. of sodium cyanide, 500 ml. of dimethylformamide and α-chloro-3-fluoro-4-methoxybenzyl ethyl ether.

Following the procedure described in Example C, e.g., C–1, C–3 or C–8 using corresponding molar equivalents of the appropriate α-halobenzyl lower-alkyl ether, the following α-(lower-alkoxy)phenylacetonitriles are prepared: 3 - fluoro-α-n-propoxyphenylacetonitrile using α-chloro - 3 - fluorobenzyl n-propyl ether; 2,4-dibromo-α-ethoxyphenylacetonitrile using 2,4 - dibromo-α-chlorobenzyl ethyl ether; α,3,4 - triethoxyphenylacetonitrile using α-chloro - 3,4 - diethoxybenzyl ethyl ether; α-ethoxy-3 - diethylaminophenylacetonitrile using α-chloro - 3-diethylaminobenzyl ethyl ether; α-n-butoxy - 4 - methylmercaptophenylacetonitrile using α-chloro - 4 - methylmercaptobenzyl n-butyl ether; α-ethoxy - 4 - methylsulfonylphenylacetonitrile using α-chloro-4-methylsulfonyl benzyl ethyl ether; α-ethoxy - 4 - biphenylylacetonitrile using α-chloro - 4 - biphenylylmethyl ethyl ether; 4-chloro-α-n-hexoxyphenylacetonitrile using α,4 - dichlorobenzyl n-hexyl ether; α-ethoxy - 3 - fluoro-4-methoxyphenylacetonitrile using α-chloro - 3 - fluoro - 4-methoxybenzyl ethyl ether; 4 - chloro-α-ethoxy - 2 - nitrophenylacetonitrile using α,4 - dichloro - 2 - nitrobenzyl ethyl ether. The foregoing intermediate α-halobenzyl lower-alkyl ethers are prepared in two steps starting with the appropriate corresponding aldehyde and following the procedures described above in Example A, e.g., A-1, A-3, A-15 or A-16, and Example B, e.g., B-1, B-2, B-5 or B-8, first to form the corresponding aldehyde di-(lower-alkyl) acetals and then the corresponding α-halobenzyl lower-alkyl ethers.

(D) ALPHA-(LOWER-ALKOXY)PHENYLACETIC ACIDS, ESTERS AND AMIDES (1) α-Methoxyphenylacetamide.—A solution of 30 g. of ethyl α-chlorophenylacetate in 100 ml. of 1.6 M methanolic sodium methylate was refluxed for three hours, the solvent stripped off and the residue partitioned between ether and cold dilute hydrochloric acid. Distillation of dried ether solution yielded 16 g. of ethyl α-methoxyphenylacetate, B.P. 130–132° C. at 19 mm. This ester was dissolved in 300 ml. of methanol which previously had been saturated with ammonia and the solution was allowed to remain at room temperature for three days. The solvent was removed and the residue recrystallized from benzene to yield 7.5 g. of α-methoxyphenylacetamide, M.P. 111–112° C.

(2) α-Methoxyphenylacetamide.—To a stirred solution containing 53.5 g. of benzaldehyde, 89.5 g. of chloroform and 100 ml. of methanol, maintained at 40–45° C., there was added dropwise a solution of 165 g. of potassium hydroxide in 400 ml. of methanol. After standing at room temperature for fourteen hours, the reaction mixture was stripped of solvent and the residual material was dissolved in water. The aqueous solution was filtered through decolorizing charcoal, and the filtrate was acidified and extracted with ether. Distillation of dried ether solution yielded 44 g. of α-methoxyphenylacetic acid, B.P. 130–134° C. at 0.7 mm. and M.P. 68–70° C. after recrystallizing from benzene-petroleum ether. Thirty grams of α-methoxyphenylacetic acid was added to a mixture of 30 ml. of thionyl chloride and 100 ml. of chloroform, and the mixture was refluxed for eight hours. The volatile liquids were removed by distilling in vacuo and the residue was dissolved in a small amount of acetone. The acetone solution was added slowly to ammonium hydroxide containing ice. The reaction mixture was distilled in vacuo and the remaining dry residue was recrystallized from aqueous isopropyl alcohol using decolorizing charcoal to yield 15.8 g. of α-methoxyphenylacetamine, M.P. 109–111° C.

(3) α-Methoxy-α-3-trifluoromethylphenylacetamide.—A solution of 10.4 g. of 3-trifluoromethylbenzaldehyde and 17.2 g. of bromoform in 50 ml. of methanol was stirred at 0–5° C. while a solution of 18 g. of potassium hydroxide in 100 ml. of methanol was added over a period of 90 minutes. The mixture was allowed to remain overnight in a melting ice bath and then most of the alcohol was removed by ether extraction and the solution acidified. The precipitated oily material was extracted and distilled to yield 8 g. of α-methoxy-3-trifluoromethylphenylacetic acid, B.P. 120–122° C. at 0.4 mm. This acid was converted into its acid chloride by refluxing a solution of 12 g. of the acid 25 ml. of thionyl chloride for two hours and removing the excess thionyl chloride by vacuum-distillation. The acid chloride was added slowly to ammonium hydroxide containing ice and the semi-solid amide was collected and recrystallized twice from benzene-petroleum ether to yield 4.5 g. of α-methoxy - 3 - trifluoromethylphenylacetamide, M.P. 96–97° C.

(4) α-n-Butoxyphenylacetamide.—To a stirred solution of 32.4 g. of benzaldehyde, 81 g. of bromoform and 100 ml. of n-butanol kept at about 5–10° C. was added dropwise a solution prepared by reacting 34.5 g. of sodium with 700 ml. of n-butanol. After remaining overnight, the mixture was distilled to dryness and the residue taken up in water. The aqueous solution was clarified by ether extract, acidified and the precipitated oily acid was extracted with ether and fractionated to yield 14.1 g. of α-n-butoxyphenylacetic acid, B.P. 130–132° C. at 0.4 mm. This acid (14 g.) was combined with 25 ml. thionyl chloride and 50 ml. of benzene and refluxed for two hours. The solvent was removed and the residue was added to iced ammonium hydroxide to yield 7 g. of α-n-butoxyphenylacetamide, M.P. 84–85° C., after recrystallization from n-heptane.

(5) 4 - chloro-α-methoxyphenylacetamide, M.P. 133–134° C., was prepared in 37% yield as in Example D-3 using corresponding molar equivalent quantities of 4-chlorobenzaldehyde, bromoform and methanol to form 4 - chloro-α-methoxyphenylacetic acid, B.P. 148–149° C. at 0.5 mm. and M.P. 82–84° C. and converting the acid to its acid chloride using thionyl chloride and reacting the acid with ammonia to yield the amide.

(6) α-Ethoxyphenylacetamide.—B.P. 140–144° C. at 0.4 mm. and M.P. 72–74° C. after recrystallization from n-heptane, was obtained as in Example D-2 first using corresponding molar equivalent quantities of benzaldehyde, chloroform and ethanol in the presence of potassium hydroxide to give a 37% yield of α-ethoxyphenylacetic acid, B.P. 137–179° C. at 0.7 mm.; and then successively converting the acid to its acid chloride with thionyl chloride and then to its amide with ammonia.

(7) α-Methoxy-4-biphenylylacetic acid.—To a stirred suspension of 25 g. of 4-biphenylcarboxaldehyde, 37.8 g. of bromoform and 150 ml. of methanol stirred at 0–5° C. was added dropwise a solution of 48 g. of 85% potassium hydroxide in 230 ml. of methanol. About one-half of the potassium hydroxide-methanol solution was added over a thirty minute period and the remainder was added more rapidly over a fifteen minute period. The reaction mixture was stirred in a melting ice bath for about twenty hours and evaporated in vacuo to remove the methanol and water. The residue was taken up with a mixture of ethyl acetate and water. The aqueous layer was separated and acidified. The acidic solution was extracted with chloroform and the remaining acidic solution evaporated in vacuo. The remaining solid residue was crystallized first from benzene and then from isopropyl alcohol to yield 13.6 g. of α-methoxy-4-biphenylylacetic acid, M.P. 130.5–133° C.

(8) α - Methoxy - N-n-propylphenylacetamide.—A reaction mixture containing 10.7 g. of methyl α-methoxyphenylacetate and 50 ml. of n-propylamine was refluxed for about sixteen hours. The excess n-propylamine was then distilled off in vacuo to yield, as an oil, α-methoxy-N-n-propylphenylacetamide.

(E) ALPHA - (LOWER - ALKOXY)PHENYLACETONITRILES FROM ALPHA-(LOWER-ALKOXY) PHENYLACETAMIDES (1) α-Methoxyphenylacetonitrile.—A solution of 7.5 g. of α-methoxy-α-phenylacetamide in 30 ml. of thionyl chloride was refluxed for two hours and distilled to yield 3.9 g. of α-methoxy-α-phenylacetonitrile, B.P. 120–123° C. at 19 mm.

(2) α - Methoxy - 3 - trifluoromethylphenylacetonitrile.—2.5 g., B.P. 115–120° C. at 17 mm., was prepared as in Example E-1 using 4 g. of α-methoxy-3-trifluoromethylphenylacetamide and 20 ml. of thionyl chloride.

(3) α - n - Butoxyphenylacetonitrile.—4.9 g., B.P. 146–148° C. at 16 mm., was prepared as in Example E-1 using 7 g. of α-n-butoxy-α-phenylacetamide and 20 ml. of thionyl chloride.

(4) 4 - chloro - α - methoxyphenylacetonitrile.—B.P. 99–103° C. at 0.7 mm., was prepared in 59% yield by dehydration of α-methoxy - α-4-chlorophenylacetamide by heating it with thionyl chloride in benzene until the theoretical quantity of water was removed.

(5) α-Ethoxyphenylacetonitrile.—B.P. 101–106° C. at 0.4 mm., was prepared as in Example E–4 in 73% yield by heating α-ethoxyphenylacetamide with thionyl chloride in benzene.

(F) OTHER 2-(LOWER-ALKOXY)-2-PHENYL-ALKANENITRILES (1) 2 - ethoxy - 2 - phenylbutanenitrile.—To a stirred solution of 32.2 g. of α-ethoxyphenylacetonitrile in 100 ml. of tetrahydrofuran, kept at about 5–10° C. using an ice bath, was added dropwise under nitrogen 27 g. of potassium tertiary-butoxide as a 10% w./v. solution in tetrahydrofuran. After the addition, which took thirty minutes, the reaction mixture was stirred an additional fifteen minutes in ice; the ice bath was removed and the mixture stirred an additional fifteen minutes. To the reaction mixture kept at about 15–20° C. was added dropwise over a period of about fifteen minutes 39 g. of ethyl iodide. The ice bath was removed and the reaction mixture stirred for forty-five minutes. Then enough glacial acetic acid was added until the reaction mixture was no longer basic to wet pH paper (about 0.5 ml.). The mixture was then filtered through sintered glass and the residual salts thoroughly washed with ether. The combined washings and filtrate were distilled in vacuo to yield 23.8 g. of 2-ethoxy-2-phenylbutanenitrile, B.P. 113–114° C. at 12 mm.

(2) 2 - (4 - chlorophenyl)-ethoxybutanenitrile.—B.P. 128–129° C. at 9 mm., 22.3 g., was prepared as in Example F–1 by first adding a solution of 39.0 g. of 4-chloro-α-ethoxyphenylacetonitrile in 30 ml. of tetrahydrofuran dropwise over a period of forty-five minutes to a solution containing 28.0 g. of potassium tertiary-butoxide in 200 ml. of tetrahydrofuran, maintaining the mixture at about 5–10° C.; stirring the mixture with cooling for another hour; then adding dropwise over a period of about thirty minutes to the stirred solution cooled to about 10° C. a solution of 42.1 g. of ethyl iodide in 20 ml. of tetrahydrofuran; and working up the reaction mixture as in Example F–1.

Following the procedure described above in Example F–1 and using corresponding molar equivalent quantities of the appropriate α-(lower-alkoxy)phenylacetonitrile and lower-alkyl or lower-alkenyl halide, the following 2-(lower-alkoxy)-2-phenylalkanenitriles are obtained: 2-ethoxy-2-phenylpropanenitrile using α-ethoxyphenylacetonitrile and methyl iodide; 2-(4-chlorophenyl)-2-ethoxypentanenitrile using 4-chloro-α-ethoxyphenylacetonitrile and n-propyl iodide; 2-(3-chlorophenyl)-2-ethoxyhexanenitrile using 3-chloro-α-ethoxyphenylacetonitrile and n-butyl bromide; 2-ethoxy-2-phenyloctanenitrile using α-ethoxyphenylacetonitrile and n-hexyl bromide; and, 2-ethoxy - 2 - (3 - fluorophenyl) - 4 - pentenenitrile using α - ethoxy - 3-fluorophenylacetonitrile and allyl bromide.

(G) LOWER-ALKYL 2-(LOWER-ALKOXY)-2-PHENYLALKANIMIDATES (1) Ethyl 2-ethoxy-2-phenylacetimidate.—Into a stirred mixture containing 17 g. of α-ethoxyphenylacetonitrile, 7 ml. of absolute ethanol and 600 ml. of dry ether cooled to 0° C. was bubbled slowly hydrogen chloride until the reaction mixture was saturated (about one hour). The reaction mixture was then allowed to warm up to room temperature and the ether taken off in vacuo to a volume of about 100 ml. whereupon a white solid separated. After cooling the mixture in an ice bath, the precipitate was collected and dried in a vacuum desiccator to yield 14.9 g. of ethyl 2-ethoxy-2-phenylacetimidate as its hydrochloride, a hygroscopic compound which should be kept in a closed container. A 4.0 g. sample of this compound was slurried with 5 ml. of cold absolute ethanol; the ethanol decanted; and addition of the ethanol and its removal repeated; the compound dried at room temperature and 0.1 mm. for five hours, and found to melt at 115° C. with decomposition.

Following the procedure described in Example G–1 using a corresponding molar equivalent quantity of the appropriate α-(lower-alkoxy)phenylacetonitrile or 2-(lower-alkoxy)-2-phenylalkanenitrile in place of α-ethoxyphenylacetonitrile, the following ethyl 2-(lower-alkoxy)-2-phenylalkanimidates in the form of their hydrochlorides are obtained:

ethyl 2-(2,6-dichlorophenyl)-2-ethoxyacetimidate,
ethyl 2-(2-chlorophenyl)-2-ethoxyacetimidate,
ethyl 2-(3,4-dichlorophenyl)-2-ethoxyacetimidate,
ethyl 2-phenyl-2-n-propoxyacetimidate,
ethyl 2-methoxy-2-phenylacetimidate,
ethyl 2-ethoxy-2-(1-naphthyl)acetimidate,
ethyl 2-methoxy-2-(1-naphthyl)acetimidate,
ethyl 2-methoxy-2-(3-trifluoromethylphenyl)acetimidate,
ethyl 2-(4-chlorophenyl)-2-methoxyacetimidate,
ethyl 2-(n-butoxy)-2-phenylacetimidate,
ethyl 2-ethoxy-2-(2-methoxyphenyl)acetimidate,
ethyl 2-ethoxy-2-phenylbutanimidate,
ethyl 2-ethoxy-2-(3-fluorophenyl)acetimidate,
ethyl 2-ethoxy-2-(4-isopropylphenyl)acetimidate,
ethyl 2-ethoxy-2-(5-indanyl)acetimidate,
ethyl 2-ethoxy-2-(4-methoxyphenyl)acetimidate,
ethyl 2-(2,4-dibromophenyl)-2-ethoxyacetimidate,
ethyl 2-ethoxy-2-(3,4-diethoxyphenyl)acetimidate,
ethyl 2-ethoxy-2-(3-diethylaminophenyl)acetimidate,
ethyl 2-ethoxy-2-(4-ethylphenyl)acetimidate,
ethyl 2-n-butoxy-2-(4-methylmercaptophenyl)acetimidate,
ethyl 2-ethoxy-2-(4-methylsulfonylphenyl)acetimidate,
ethyl 2-ethoxy-2-(4-biphenylyl)acetimidate,
ethyl 2-(4-chlorophenyl)-2-n-hexoxyacetimidate,
ethyl 2-ethoxy-2-(3-fluorophenyl)-4-pentenimidate,
ethyl 2-ethoxy-2-phenyloctanimidate,
ethyl 2-ethoxy-2-(2-naphthyl)acetimidate,
ethyl 2-ethoxy-2-(4-methylphenyl)acetimidate,
ethyl 2-(4-benzyloxyphenyl)-2-ethoxyacetimidate,
ethyl 2-(3-cyclohexenyl)-2-ethoxyacetimidate,
ethyl 2-(3-chlorophenyl)-2-ethoxyacetimidate,
ethyl 2-ethoxy-2-(3-fluoro-4-methoxyphenyl)acetimidate,
ethyl 2-(4-chlorophenyl)-2-ethoxybutanimidate and
ethyl 2-(4-chloro-2-nitrophenyl)-2-ethoxyacetimidate.

Following the procedure described in Example G–1 using a corresponding molar equivalent quantity of methanol, n-propanol, n-butanol or n-hexanol in place of ethanol, there is obtained the corresponding methyl, n-propyl, n-butyl or n-hexyl 2-ethoxy-2-phenylacetimidate in the form of its hydrochloride.

(H) 2-(LOWER-ALKOXY)-2-PHENYL-ALKANAMIDINES (1) 2-ethoxy-2-phenyl-N-n-propylacetamidine.—A mixture containing 3.5 ml. of n-propylamine, 7.3 g. of ethyl 2-ethoxy-2-phenylacetimidate hydrochloride and 40 ml. of ethanol was stirred at room temperature (25–30° C.) under anhydrous conditions for forty-eight hours and then allowed to stand overnight (about fifteen hours) without stirring. The solvent was removed in vacuo at 30° C. The remaining oil was treated with aqueous potassium carbonate solution and the mixture extracted with chloroform. The extract was dried over anhydrous potassium carbonate and evaporated to remove the chloroform. To the remaining oil (6.7 g.) was added a 10% excess of 4.5 N methanolic hydrogen chloride followed by ether and then cooled whereupon the precipitated oil solidified. The solid was collected, washed with ether and dried for forty hours at 40° C. and 0.1 mm. over phosphorus pentoxide to yield 5.6 g. of 2-ethoxy-2-phenyl-N-n-propylacetamidine as its hydrochloride, M.P. 174° C. with decomposition.

(2) 2-ethoxy-N,N-tetramethylene-2-phenylacetamidine.

As its hydrochloride, M.P. 158–159° C., 8.8 g., was prepared following the procedure described in Example H–1 using 4.7 ml. of pyrrolidine, 9.7 g. of ethyl 2-ethoxy-2-phenylacetimidate hydrochloride, 47 ml. of ethanol and a stirring period of twenty-four hours.

(3) N-n-butyl-2-ethoxy - 2 - phenylacetamidine.—To a cooled mixture containing 24.3 g. of ethyl 2-ethoxy-2-phenylacetimidate hydrochloride and 20 ml. of absolute ethanol was added with stirring 10.4 g. of n-butylamine. After about five minutes at room temperature, dissolution was complete and the reaction mixture was allowed to stand at room temperature for twenty-four hours. The ethanol was removed in vacuo at 25° C. and the remaining oil treated with an excess of 5% cold sodium hydroxide solution. The mixture was extracted with ether. The ether extract was washed with saturated sodium chloride solution, dried over anhydrous sodium sulfate and the ether removed in vacuo. The residue was treated with 3.5 N ethereal hydrogen chloride and the resulting mixture containing a gummy precipitate was placed in a refrigerator overnight whereupon the gum solidified. The solid was collected to yield 9.8 g. of N-n-butyl-2-ethoxy-2-phenylacetamidine as its hydrochloride, M.P. 118° C.

(4) 2-ethoxy-N-(3 - methoxypropyl) - 2 - phenylacetamidine.—As its hydrochloride, M.P. 99–100° C., 15.8 g., was prepared following the procedure described in Example H–3 using 17.1 g. of ethyl 2-ethoxy - 2 - phenylacetimidate hydrochloride, 15 ml. of ethanol and 7.9 ml. of 3-methoxypropylamine.

(5) N - benzyl - 2 - ethoxy - 2 - phenylacetamidine.—As its hydrochloride, M.P. 102° C. with decomposition, 12.2 g., was prepared as in Example H–3 using 12.2 g. of ethyl 2-ethoxy - 2 - phenylacetimidate hydrochloride, 10 ml. of ethanol and 6.0 ml. of benzylamine.

(6) 2-ethoxy-N-(2 - phenylethyl) - 2 - phenylaceamidine.—To a stirred cooled (to 5° C.) suspension containing 12.2 g. of ethyl 2-ethoxy - 2 - phenylacetimidate hydrochloride and 25 ml. of ethanol was added 6.06 g. of 2-phenylethylamine followed by addition of 2.7 g. of sodium methoxide in 25 ml. of ethanol. The reaction mixture was stirred at 15–20° C. for two hours and then filtered through infusorial earth. The ethanol was removed in vacuo from the filtrate at 30° C. The remaining oil was washed successively with a small volume of benzene and water then dried in vacuo. The resulting oil was treated with 3.5 N etheral hydrogen chloride whereupon a precipitate separated. After the mixture had been refluxed for two hours, the precipitate was collected, washed with ether and dried at room temperature over phosphorus pentoxide at 0.1 mm. for four hours to yield 11.6 of 2 - ethoxy - N - (2 - phenylethyl) - 2 - phenylacetamidine as its hydrochloride M.P. 195° C. with decomposition.

(7) N - cyclohexyl - 2 - ethoxy - 2 - phenylacetamidine.—To a stirred mixture containing 17.1 g. of ethyl 2-ethoxy - 2 - phenylacetimidate hydrochloride and 13 ml. of absolute ethanol was added 8.7 ml. of cyclohexylamine thereby yielding a reaction mixture with a pH of 7.5. The reaction mixture was stirred for one hour and then allowed to stand for three days; it was next extracted with aqueous hydrochloric acid and the acidic extract extracted with aqueous soduim hydroxide solution. The alkaline extract was extracted with ether. The ether extract was dried over anhydrous soduim sulfate and the ether removed in vacuo to yield an oil which solidified at room temperature. The solid was dried at room temperature and 0.1 mm. for two hours to yield 4.8 g. of N-cyclohexyl - 2 - ethoxy - 2 - phenylacetamidine, 75–76° C.

(8) 2 - ethoxy-N-isobutyl - 2 - phenylacetamidine.—To a suspension containing 20.0 g. of ethyl 2-ethoxy-2-phenylacetimidate hydrochloride in 90 ml. of tetrahydrofuran was added 6.6 g. of isobutylamine in 10 ml. of tetrahydrofuran, whereupon the reaction temperature rose to about 40° C. After allowing the reaction mixture to stand for one hour at 33° C., the solid was collected, washed with tetrahydrofuran and dried in vacuo at room temperature over phosphorus pentoxide to yield 20.7 g. of 2 - ethoxy - N - isobutyl - 2 - phenylacetamidine as its hydrochloride M.P. 179.5–181.0° C.

(9) 2 - ethoxy - N,N - hexamethylene - 2 - phenylacetamidine.—To a stirred suspension of 24.3 g. of ethyl 2-ethoxy - 2 - phenylacetimidate hydrochloride in 100 ml. of tetrahydrofuran cooled to 0° C. was added a solution containing 5.4 g. of sodium methoxide in 50 ml. of methanol. To the suspension was added 11.5 ml. of homopiperidine, i.e., hexahydro - 1H - azepine, and the resulting mixture stirred for two hours at room temperature and then allowed to stand overnight. The precipitated sodium chloride was filtered off by filtering the reaction mixture through infusorial earth and the tetrahydrofuran was removed in vacuo at 30° C. from the filtrate. The remaining oil was taken up in ether; the ether solution was washed with water, dried over anhydrous sodium sulfate; and, the ether was removed in vacuo to yield 22.7 g. of 2-ethoxy-N,N-hexamethylene-2-phenylacetamide as a yellow oil.

(10) 2 - ethoxy - N - isopropyl - 2 - phenylacetamidine.—In a free base form, 10.4 g. as a yellow oil, was obtained following the procedure described in Example H–1 using 12.1 g. of ethyl 2 - ethoxy - 2 - phenylacetimidate hydrochloride, 50 ml. of ethanol and 5.9 ml. of isopropylamine. Its methanesulfonate salt was prepared by treating 6.8 g. of the base in 60 ml. of ether with 3.3 g. of methanesulfonic acid in 20 ml. of ether. The mixture was cooled and the ether decanted from the precipitated gummy material which was placed in a refrigerator overnight whereupon the gum became crystalline. The crystalline material was washed well with ether and dried overnight at room temperature and 0.1 mm. over phosphorus pentoxide to yield 7.4 g. of 2-ethoxy-N-isopropyl - 2 - phenylacetamidine as its methanesulfonate, M.P. 190–191° C.

(11) 2 - ethoxy - N - tetrahydrofurfuryl - 2 - phenylacetamidine.—A mixture containing 8.3 g. of tetrahydrofurfurylamine, ethyl 2-ethoxy - 2 - phenylacetimidate hydrochloride and 120 ml. of tetrahydrofuran was stirred for one hour at 25° C. After addition of another 2 g. portion of tetrahydrofurfurylamine, the reaction mixture was stirred for another hour and then the solvent and excess amine distilled off in vacuo. The residue was taken up to a 1:1 (v./v.) mixture of ether and benzene. Water and 35% aqueous sodium hydroxide solution was added until the mixture was strongly basic. The mixture was shaken well and the organic layer was separated. The acidic extract was made strongly basic with 35% aqueous sodium hydroxide solution (also adding ice) and the basic mixture extracted with chloroform. The chloroform extract was dried over anhydrous potassium carbonate and heated in vacuo to remove the chloroform. The residue was taken up in tetrahydrofuran and the solution treated with ethereal hydrogen chloride. When no product separated, the solution was evaporated to remove the ether and the residue allowed to stand for ten months after which time it become partially crystalline; this material was dissolved in 100 ml. of acetone and allowed to stand at room temperature. The resulting crystalline precipitate was collected, washed with acetone, dried at 50° C. in vacuo for twenty-four hours to yield 2.3 g. of 2-ethoxy-N-tetrahydrofurfuryl - 2 - phenylacetamidine as its hydrochloride, M.P. 121–125° C.

(12) 2-ethoxy-N-n-hexyl-2-phenylacetamidine.—A mixture containing 24.3 g. of ethyl 2-ethoxy-2-phenylacetimidate hydrochloride, 30 ml. of absolute ethanol and 14.6 ml. of n-hexylamine was allowed to stand at room temperature for six days. The ethanol was removed in vacuo at 30° C. and to the residue was added 70 ml. of 3 N aqueous sodium hydroxide solution. The alkaline solution was extracted with 500 ml. of ether. The ether extract was washed with water and then extracted with 150 ml. of 1 N hydrochloric acid. The acidic solution was extracted with 200 ml. of chloroform (dissolved the product as its hydrochloride). The chloroform extract was made alkaline with cold 10% aqueous sodium hydroxide solution, washed with water, dried over anhydrous sodium sulfate and heated in vacuo to remove the chloroform. The remaining colorless oil was dissolved in ether and the ether solution treated with an excess of 3.5 N hydrogen chloride in ether. After the resulting mixture had been cooled for two hours, the separated solid was collected and recrystallized from methanol-ether to yield 19.5 g. of 2-ethoxy-N-n-hexyl-2-phenylacetamidine as its hydrochloride, M.P. 108–109° C.

Following the procedure described in Example H–1 using corresponding molar equivalent quantities of the appropriate ethyl 2-(lower-alkoxy)-2-phenylalkanimidate as its hydrochloride in place of ethyl 2-ethoxy-2-phenylacetimidate hydrochloride and the appropriate amine in place of n-propylamine, the following 2-(lower-alkoxy)-2-phenylalkyanamidines are prepared:

2-(2,6-dichlorophenyl)-2-ethoxy-N-n-propylacetamidine using ethyl 2-(2,6-dichlorophenyl)-2-ethoxyacetimidine and n-propylamine;

2-(2-chlorophenyl)-2-ethoxy-N,N-($\alpha$-methyltetramethylene)acetamidine using ethyl 2-(2-chlorophenyl)-2-ethoxyacetimidate and 2-methylpyrrolidine;

N-n-butyl-2-(3,4-dichlorophenyl)-2-ethoxyacetamidine using ethyl 2-(3,4-dichlorophenyl)-2-ethoxyacetimidate and n-butylamine;

N-cyclopropyl-2-phenyl-n-propoxyacetamidine using ethyl 2-phenyl-2-n-propoxyacetimidate and cyclopropylamine;

N-(2-ethoxyethyl)-2-methoxy-2-phenylacetamidine using ethyl 2-methoxy-2-phenylacetimidate and 2-ethoxyethylamine;

2-ethoxy-N-methyl-2-(1-naphthyl)acetamidine using ethyl 2-ethoxy-2-(1-naphthyl)acetimidate and methylamine;

N-ethyl-2-methoxy-2-(1-naphthyl)acetamidine using ethyl 2-methoxy-2-(1-naphthyl)acetimidate and ethylamine;

2-methoxy-N-n-propyl-2-(3-trifluoromethylphenyl) acetamidine using ethyl 2-methoxy-2-(3-trifluoromethylphenyl)acetimidate and n-propylamine;

2-(4-chlorophenyl)-2-methoxy-N-cyclopentylacetamidine using ethyl 2-(2-chlorophenyl)-2-methoxyacetimidate and cyclopentylamine;

2-(n-butoxy)-2-phenyl-N-n-propylacetamidine using ethyl 2-(n-butoxy)-2-phenylacetimidate and n-propylamine;

2-ethoxy-2-(2-methoxyphenyl)-N,N-pentamethyleneacetamidine using ethyl 2-ethoxy-2-(2-methoxyphenyl) acetimidate and piperidine;

2-ethoxy-2-phenyl-N-n-propylbutanacetamidine using ethly 2-ethoxy-2-phenylbutanacetimidate and n-propylamine;

2-ethoxy-2-(3-fluorophenyl)-N,N-tetramethyleneacetamidine using ethyl 2-ethoxy-2-(3-fluorophenyl)acetimidate and pyrrolidine;

N-n-butyl-2-ethoxy-2-(4-isopropylphenyl)acetamidine using ethyl 2-ethoxy-2-(4-isopropylphenyl)acetimidate and n-butylamine;

2-ethoxy-2-(5-indanyl)-N-isopropylacetamidine using ethyl 2-ethoxy-2-(5-indanyl)acetimidate and isopropylamine;

N-2-butyl-2-ethoxy-2-(4-methoxyphenyl)acetamidine using ethyl 2-ethoxy-2-(4-methoxyphenyl)acetimidate and 2-butylamine;

2-(2,4-dibromophenyl)-2-ethoxy-N-n-propylacetamidine using ethyl 2-(2,4-dibromophenyl)-2-ethoxyacetimidate and n-propylamine;

N-n-butyl-2-ethoxy-2-(3,4-diethoxyphenyl)acetamidine using ethyl 2-ethoxy-2-(3,4-diethoxyphenyl)acetimidate and n-butylamine;

2-ethoxy-2-(3-diethylaminophenyl)-N-n-propylacetamidine using ethyl 2-ethoxy-2-(3-diethylaminophenyl) acetimidate and n-propylamine;

2-ethoxy-2-(4-ethylphenyl)-N-n-propylacetamidine using ethyl 2-ethoxy-2-(4-ethylphenyl)acetimidate and n-propylamine;

2-n-butoxy-2-(4-methylmercaptophenyl)-N,N-tetramethyleneacetamidine using ethyl 2-n-butoxy-2-(4-methylmercaptophenyl)acetimidate and pyrrolidine;

2-ethoxy-2-(4-methylsulfonylphenyl)-N-n-propylacetamidine with ethyl 2-ethoxy-2-(4-methylsulfonylphenyl)acetimidate and n-propylamine;

2-ethoxy-2-(4-biphenylyl)-N-n-propylacetamidine using ethyl 2-ethoxy-2-(4-biphenylyl)acetimidate and n-propylamine;

2-(4-chlorophenyl)-2-n-hexoxy-N,N-($\alpha,\alpha'$-dimethylpentamethylene)acetamidine using ethyl 2-(4-chlorophenyl)-2-n-hexoxyacetimidate and 2,6-dimethylpiperidine;

2-ethoxy-2-(3-fluorophenyl)-N-n-propyl-4-pentenamidine using ethyl 2-ethoxy-2-(3-fluorophenyl)-4-pentenimidate and n-propylamine;

2-ethoxy-2-phenyl-N-n-propyloctanamidine using ethyl 2-ethoxy-2-phenyloctanimidate and n-propylamine;

2-ethoxy-2-(2-naphthyl)-N,N-tetramethyleneacetamidine using ethyl 2-ethoxy-2-(2-naphthyl)acetimidate and pyrrolidine;

N-n-butyl-2-ethoxy-2-(4-methylphenyl)acetamidine using ethyl 2-ethoxy-2-(4-methylphenyl)acetimidate and n-butylamine;

2-(4-benzyloxyphenyl)-2-ethoxy-N-n-propylacetamidine using ethyl 2-(4-benzyloxyphenyl)-2-ethoxyacetimidate and n-propylamine;

2-(3-cyclohexenyl)-2-ethoxy-N-n-propylacetamidine using ethyl 2-(3-cyclohexenyl)-2-ethoxyacetimidate and n-propylamine;

2-(3-chlorophenyl)-2-ethoxy-N-n-propylacetamidine using ethyl 2-(3-chlorophenyl)-2-ethoxyacetimidate and n-propylamine;

N-n-butyl-2-ethoxy-2-(3-fluoro-4-methoxyphenyl)acetamidine using ethyl 2-ethoxy-2-(3-fluoro-4-methoxyphenyl)acetimidate and n-butylamine;

2-(4-chlorophenyl)-2-ethoxybutanamidine using ethyl 2-(4-chlorophenyl)-2-ethoxybutanimidate and n-propylamine;

and, 2-(4-chloro-2-nitrophenyl)-2-ethoxyacetamidine using ethyl 2-(4-chloro-2-nitrophenyl)-2-ethoxyacetimidate and n-propylamine.

Also prepared using the indicated known procedures are: 2 - ethoxy-2-(4-hydroxyphenyl)-N-n-propylacetamidine by refluxing 2-(4-benzyloxyphenyl)-2-ethoxy-N-n-propylacetamidine with hydrogen chloride in absolute ethanol; 2-cyclohexyl-2-ethoxy-N-n-propylacetamidine by catalytically hydrogenating 2-(3-cyclohexenyl)-2-ethoxy-N-n-propylacetamidine in absolute ethanol using platinum dioxide as the catalyst; and, 2-(2-amino-4-chlorophenyl)-2-ethoxy-N-n-propylacetamidine as its dihydrochloride by catalytically hydrogenating in absolute ethanol 2-(4-chloro-2-nitrophenyl)-2-ethoxy-N-n-propylacetamidine in the presence of two equivalents of hydrogen chloride using 10% palladium on charcoal as the catalyst.

Following the procedure described in Example H–1 using a corresponding molar equivalent quantity of methyl, n-propyl, n-butyl or n-hexyl 2-ethoxy-2-phenylacetimidate hydrochloride in place of ethyl 2-ethoxy-2-acetimidate hydrochloride, there also is obtained 2-ethoxy-2-propyl-N-n-propylacetamidine.

(I) N,N''-ALKYLENEBIS[2-(LOWER-ALKOXY)-2-PHENYLALKANAMIDINES]

(1) N,N'' - nonamethylenebis[2 - ethoxy-2-phenylacetamidine].—To a stirred cooled (0° C.) suspension containing 12.2 g. of ethyl 2-ethoxy-2-phenylacetimidate hydrochloride and 25 ml. of ethanol was added 2.94 g. of 1,9-nonanediamine followed by addition of 2.7 g. of sodium methoxide in 30 ml. of ethanol. The reaction mixture was stirred at room temperature for six hours and the precipitated sodium chloride was filtered off. The ethanol was removed in vacuo from the filtrate at 30° C. The remaining oil was treated with 50 ml. of 10% aqueous sodium hydroxide solution and the mixture extracted with ether. The ether extract was washed successively with water and brine, dried over anhydrous sodium sulfate and heated in vacuo to remove the ether. The residue of 12.6 g. was treated with an equivalent amount of 3.5 N of ethereal hydrogen chloride. The product was collected and dried over phosphorus pentoxide at room temperature and 0.1 mm. to yield 10.1 g. of N,N''-nonamethylenebis[2-ethoxy-2-phenylacetamidine] as its dihydrochloride, M.P. 158° C.

(2) N,N'' - decamethylenebis[2 - ethoxy-2-phenylacetamidine], as its dihydrochloride, M.P. 141–144° C. with decomposition, 7.5 g., was prepared following the procedure described in Example I–1 using 12.2 g. of ethyl 2-ethoxy-2-phenylacetimidate hydrochloride, 25 ml. of ethanol, 4.3 g. of 1,10-decanediamine, 2.7 g. of sodium methoxide and 30 ml. of ethanol.

(3) N,N''-octamethylenebis[2-ethoxy - 2 - phenylacetamidine], as its dihydrochloride, M.P. 135° C. with decomposition, 10.1 g., was prepared following the procedure described in Example I–1 using 12.2 g. of ethyl 2-ethoxy-2-phenylacetimidate hydrochloride, 25 ml. of ethanol, 3.6 g. of 1,8-octanediamine, 2.7 g. of sodium methoxide and 25 ml. of ethanol.

(4) N,N'' - nonamethylenebis[2 - (4 - chlorophenyl)-2-ethoxyacetamidine], as its dihydrochloride, M.P. 176° C. with decomposition, 8.6 g., was prepared following the procedure described in Example I–1 using 12.3 g. of ethyl 2-ethoxy-2-phenylacetimidate hydrochloride, 25 ml. of ethanol, 3.2 g. of 1,9-nonanediamine in 25 ml. of methanol, 2.1 g. of sodium methoxide in 30 ml. of methanol.

Following the procedure described in Example I–1 using corresponding molar equivalent quantities of the appropriate lower-alkyl 2-(lower-alkoxy)-2-phenylalkanimidate hydrochloride in place of ethyl 2-ethoxy-2-phenylacetimidate hydrochloride and the appropriate alkylenediamine in place of 1,9-nonanediamine, the following N,N''-alkylenebis[2-(lower-alkoxy) - 2 - phenylalkanamidines] are prepared:

N,N''-1,2-ethanebis[2-methoxy-2-(3-trifluoromethylphenyl)acetamidine] using ethyl 2-methoxy-2-(3-trifluoromethylphenyl)acetimidate and 1,2-ethanediamine;
N,N''-1,2-propanebis[2-ethoxy-2-(2-methoxyphenyl)acetamidine] using ethyl 2-ethoxy-2-(2-methoxyphenyl)acetimidate and 1,2-propanediamine;
N,N''-trimethylenebis[2-ethoxy-2-phenylbutanamidine] using ethyl 2-ethoxy-2-phenylbutanimidate and 1,3-propanediamine;
N,N''-1,2-butanebis[2-ethoxy-2-(3-fluorophenyl)acetamidine]using ethyl 2-ethoxy-2-(3-fluorophenyl)acetimidate and 1,2-butanediamine;
N,N''-tetramethylenebis[2-ethoxy-2-(4-methoxyphenyl)acetamidine] using ethyl 2-ethoxy-2-(4-methoxyphenyl)acetimidate and 1,4-butanediamine;
N,N''-hexamethylenebis[2-ethoxy-2-(3,4-diethoxyphenyl)acetamidine] using ethyl 2-ethoxy-2-(3,4-diethoxyphenyl)acetimidate and 1,6-hexanediamine;
N,N''-pentamethylenebis[2-ethoxy-2-(3-diethylaminophenyl)acetamidine] using ethyl 2-ethoxy-2-(3-diethylaminophenyl)acetimidate and 1,5-pentanediamine;
N,N''-heptamethylenebis[2-n-butoxy-2-(4-methylmercaptophenyl)acetamidine] using ethyl 2-n-butoxy-2-(4-methylmercaptophenyl)acetimidate and 1,7-heptanediamine;
N,N''-dodecamethylenebis[2-ethoxy-2-(4-methylsulfonylphenyl)acetamidine] using ethyl 2-ethoxy-2-(4-methylsulfonylphenyl)acetimidate and 1,12-dodecanediamine;
N,N''-nonamethylenebis[2-ethoxy-2-(3-fluorophenyl)-4-pentenamidine] using ethyl 2-ethoxy-2-(3-fluorophenyl)-4-pentenimidate and 1,9-nonanediamine;
N,N''-octamethylenebis[2-ethoxy-2-phenyloctanamidine] using ethyl 2-ethoxy-2-phenyloctanimidate and 1,8-octanediamine;
N,N''-hexamethylenebis[2-(4-chlorophenyl)-2-n-hexoxyacetamidine] using ethyl 2-(4-chlorophenyl)-2-n-hexoxyacetimidate and 1,6-hexanediamine;
N,N''-octamethylenebis[2-ethoxy-2-(2-naphthyl)acetamidine] using ethyl 2-ethoxy-2-(2-naphthyl)acetimidate and 1,8-octanediamine;
N,N''-nonamethylenebis[2-ethoxy-2-(4-methylphenyl)acetamidine] using ethyl 2-ethoxy-2-(4-methylphenyl)acetimidate and 1,9-nonanediamine;
N,N''-octamethylenebis[2-(4-benzyloxyphenyl)-2-ethoxyacetamidine] using ethyl 2-(4-benzyloxyphenyl)-2-ethoxyacetimidate and 1,8-octanediamine;
N,N''-hexamethylenebis[2-(3-cyclohexenyl)-2-ethoxyacetamidine] using ethyl 2-(3-cyclohexenyl)-2-ethoxyacetimidate and 1,6-hexanediamine;
N,N''-decamethylenebis[2-ethoxy-2-(3-fluoro-4-methoxyphenyl)acetamidine] using ethyl 2-ethoxy-2-(3-fluoro-4-methoxyphenyl)acetimidate and 1,10-decanediamine;
and, N,N''- octamethylenebis[2-(4-chloro-2-nitrophenyl)-2-ethoxyacetamidine] using ethyl 2-(4-chloro-2-nitrophenyl)-2-ethoxyacetimidate and 1,8-octanediamine.

Also prepared by the indicated known procedures are: N,N''-octamethylenebis[2-ethoxy - 2 - (4-hydroxyphenyl)acetamidine] by refluxing N,N''-octamethylenebis[2-(4-benzyloxyphenyl) - 2 - ethoxyacetamidine] with hydrogen chloride in absolute ethanol; N,N''-hexamethylenebis[2-cyclohexyl-2-ethoxyacetamidine] by catalytically hydrogenating N,N''-hexamethylenebis[2 - (2-cyclohexenyl)-2-ethoxyacetamidine] in absolute ethanol with platinum dioxide as the catalyst; and, N,N''-octamethylenebis[2-(2-amino-4-chlorophenyl)-2-ethoxyacetamidine] as its tetrahydrochloride by catalytically hydrogenating N,N''-octamethylenebis[2-(4-chloro - 2 - nitrophenyl)-2-ethoxyacetamidine in absolute ethanol in the presence of four equivalents of hydrogen chloride using 10% palladium on charcoal as the catalyst.

(J) 2-(LOWER-ALKOXY)-2-PHENYL-N,N'-DI-(LOWER-ALKYL)ALKANAMIDINES (1) 2 - ethoxy-2-phenyl-N,N'-di-n-propylacetamidine.—A mixture containing 16.1 g. of α-ethoxyphenylacetonitrile, 75 ml. of n-propylamine and five drops of carbon disulfide was heated in an autoclave at 100–107° C. for twenty-four hours with an initial pressure of 125 p.s.i. and a final pressure of 400 p.s.i. The volatile material was removed in vacuo, the remaining mobile oil was taken up in benzene and the benzene solution was extracted with 2 N hydrochloric acid. The acidic solution was washed with ether and made basic with 35% aqueous sodium hydroxide solution. Ice was added to the alkaline mixture which was then extracted with chloroform. The chloroform was dried over anhydrous potassium carbonate, treated with decolorizing charcoal, filtered and evaporated in vacuo to remove the chloroform. The remaining material was distilled under reduced pressure to yield a 12.3 g. fraction distilling at 90–92° C. at 0.01 mm. After examination of said fraction had indicated incomplete reaction, the fraction was combined with 75 ml. of n-propylamine and the mixture heated in an autoclave at 95–105° C. for twenty-four hours, with an initial pressure of 75 p.s.i. and a final pressure of 180 p.s.i. The oil was distilled under reduced pressure to yield 11.3 g. of 2-ethoxy - 2 - phenyl-N,N'-di-n-propylacetamidine, B.P. 94–95° C. at 0.01 mm.

(2) 2-(4-chlorophenyl)-2-ethoxy-N,N'-di-n-propylacetamidine.—Gaseous hydrogen sulfide was passed into 72 g. of n-propylamine for twenty seconds at a brisk rate. To the mixture was added 15.0 g. of 4-chloro-α-ethoxyphenylacetonitrile and the resulting mixture was refluxed for one hundred and sixty-eight hours. The reaction mixture was heated in vacuo to remove the excess n-propylamine. The remaining oil was taken up in benzene; the benzene solution was washed with water and then extracted with 2 N hydrochloric acid. The aqueous acidic extract was extracted with ether. The extract was cooled in an acetone-carbon dioxide bath and made basic by addition of an excess of 35% aqueous sodium hydroxide solution. The mixture was extracted with ether; the ether extract dried over anhydrous potassium carbonate and then evaporated to remove the ether. The remaining 13.1 g. of oil was distilled under reduced pressure to yield 11.7 g. of 2-(4-chlorophenyl) - 2 - ethoxy-N,N'-di-n-propylacetamidine, B.P. 115–117° C. at 0.01 mm.

(3) N,N'-di-n-butyl-2-(4 - chlorophenyl)-2-ethoxyacetamidine.—A mixture containing 15.0 g. of 4-chloro-α-ethoxyphenylacetonitrile, 100 ml. of n-butylamine and five drops of carbon disulfide was refluxed for forty-four hours and then distilled under reduced pressure to yield 8.8 g. of the product, N,N'-di-n-butyl-2-(4-chlorophenyl)-2-ethoxyacetamidine, B.P. 125–127° C. at 0.01 mm.

Following the procedure described in Example J–1 using corresponding molar equivalent quantities of the appropriate 2-(lower - alkoxy)-2-phenylalkanenitrile in place of α-ethoxyphenylacetonitrile and the appropriate lower-alkylamine in place of n-propylamine, and the following 2-(lower-alkoxy)-2-phenyl - N,N' - di - (lower-alkyl)alkanamidines are prepared:

2-methoxy-N,N'-dimethyl-2-(3-trifluoromethylphenyl) alkanamidine using α-methoxy-3-trifluoromethylphenylacetonitrile and methylamine;

2-ethoxy-N,N'-diethyl-2-(2-methoxyphenyl)alkanamide using α-ethoxy-2-methoxyphenylacetonitrile and ethylamine;

2-ethoxy-N,N'-diisopropyl-2-phenylbutanamidine using 2-ethoxy-2-phenylbutanenitrile and isopropylamine N,N'-di(2-butyl)-2-ethoxy-2-(3-fluorophenyl)acetamidine using α-ethoxy-3-fluorophenylacetonitrile and 2-butylamine;

2-ethoxy-N,N'-di-n-hexyl-2-(4-methoxyphenyl)acetamidine using α-ethoxy-4-methoxyphenylacetonitrile and n-hexylamine;

2-ethoxy-2-(3,4-diethoxyphenyl)-N,N'-di-n-propylacetamidine using α,3,4-triethoxyphenylacetonitrile and n-propylamine;

N,N'-di-n-butyl-2-ethoxy-2-(3-diethylaminophenyl)acetamidine using α-ethoxy-3-diethylaminophenylacetonitrile and n-butylamine;

2-n-butoxy-N,N'-diisobutyl-2-(4-methylmercaptophenyl) acetamidine using α-n-butoxy-4-methylmercaptoacetonitrile and isobutylamine;

2-ethoxy-2-(4-methylsulfonylphenyl)-N,N'-di-n-propylacetamidine using α-ethoxy-4-methylsulfonylphenylacetonitrile and n-propylamine;

N,N'-di-n-butyl-2-ethoxy-2-(3-fluorophenyl)-4-pentenamidine using 2-ethoxy-2-(3-fluorophenyl)-4-pentenenitrile and n-butylamine;

2-ethoxy-2-phenyl-N,N'-di-n-propyloctanamidine using 2-ethoxy-2-phenyloctanenitrile and n-propylamine; and, 2-(4-chlorophenyl)-2-n-hexoxy-N,N'-n-propylacetamidine using 4-chloro-α-n-hexoxyphenyloctanacetonitrile and n-propylamine.

(K) 2-(LOWER - ALKOXY)-2-PHENYLALKANAMIDINE OF FORMULA I WHERE R''' AND R'''' ARE DIFFERENT (1) N-n-butyl-2-methoxy - 2 - phenyl - N' - n - propylacetamidine.—To a suspension containing the α-methoxy-N-n-propylphenylacetamide of Example D–8 in dry methylene dichloride is added over a period of about five minutes at room temperature a solution containing an equal molar quantity of triethyloxonium tetrafluoroborate in dry methylene dichloride. The reaction mixture is stirred for about sixteen hours at room temperature and the resulting solution is evaporated in vacuo to about one-third of its volume and treated with about five volumes of anhydrous ether. The precipitated ethyl 2-methoxy-2-phenyl-N'-n-propylalkanimidate tetrafluoroborate is collected and stirred at room temperature in a tightly stoppered flask with forty percent excess of n-butylamine in absolute ethanol for about three days. The reaction mixture is then evaporated to dryness in vacuo and treated with a small volume of water. The aqueous mixture is made strongly basic with 5 N sodium hydroxide solution and the liberated oily product is extracted into ether. Evaporation of ether in vacuo yields N-n-butyl-2-methoxy-2-phenyl-N'-n-propylacetamidine.

Following the procedure described above in Example K–1 using pyrrolidine, piperidine or homopiperidine in place of n-butylamine, there is obtained, respectively, 2-methoxy-N,N-tetramethylene - 2 - phenyl - N' - n-propylacetamidine, 2 - methoxy - N,N - pentamethylene-2-phenyl-N'-n-propylacetamidine or 2-methoxy-N,N - hexamethylene-2-phenyl-N'-n-propylacetamidine.

The hypoglycemic activity of the compounds of Formula I was measured by the percent decrease in blood glucose levels from premedicated blood glucose levels in fasted rats generally according to the procedure of Dulin et al., Proc. Soc. Exptl. & Med. 107, 245 (1961), wherein glucose-primed rats were bled from the tail vein at 1, 2, 3 and 5 hours following medication. Hypoglycemic activity is expressed as the percent decrease in blood glucose from the control animals at the same hour. When tested by this procedure, the compounds of Formula I were found to have hypoglycemic activity when administered at oral dose levels between about 20 and 200 mg./kg.

The compounds of Formula II when tested according to the following standard in vitro bacteriological evaluation procedure were found to have antibacterial activity, for example, against *Staphylococcus aureus* and *Eberthella coli*, at test concentration levels of about 5.0 to 100 mcg./cc.: A 1000 mcg./ml. solution of the test compound is prepared. A 1:5 dilution of this solution is made and the test compound diluted serially in two-fold increments in preinoculated medium (1:5000 dilution of 18–24 hour broth cultures of the challenge organisms). All assay tubes are incubated 18–24 hours at 37° C. The tubes are examined visually for growth (turbidity). The last tube in the series showing no growth is recorded as the minimal growth inhibitory concentration.

The actual determination of the numerical hypoglycemic or antibacterial data definitive for a particular compound is readily obtained by standard test procedures, referred to above, by technicians versed in pharmacological or bacteriological test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; by incorporating them in unit dosage form as tablets or capsules for oral administration either alone or in combination with conventional adjuvants, e.g., calcium carbonate, starch, lactose, talc, magnesium stearate, gum acacia, and the like.

The subject matter which the applicant regards as his invention is particularly pointed out and distinctly claimed as follows:

1. A compound having the formula

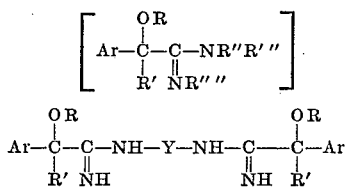

wherein
R is lower-alkyl,
R' is hydrogen, lower-alkyl or lower-alkenyl,
Y is alkylene of 2–12 carbon atoms, and
Ar is phenyl, naphthyl, indanyl, biphenylyl, cyclohexenyl, cyclohexyl or phenyl substituted by from one to three substituents selected from the group consisting of lower-alkyl, lower-alkoxy, halo, trihalomethyl, lower-alkylmercapto, lower-alkylsulfonyl, di-(lower-alkyl)amino, amino, hydroxy, nitro and benzyloxy.

2. N,N'' - polyalkylenebis[2 - (lower-alkoxy) - 2 - Ar-acetamidine] according to claim 1 where R is lower-alkyl, and R' is hydrogen.

3. N,N'' - nonamethylenebis[2 - ethoxy - 2 - phenyl-acetamidine] according to claim 2 where R is ethyl and polyalkylene is nonamethylene.

4. N,N'' - decamethylenebis[2-ethoxy - 2 - phenyl-acetamidine] according to claim 2 where Ar is phenyl, R is ethyl and polyalkylene is decamethylene.

5. N,N'' - octamethylenebis[2 - ethoxy - 2 - phenyl-acetamidine] according to claim 2 where Ar is phenyl, R is ethyl and polyalkylene is octamethylene.

6. N,N'' - nonamethylenebis[2 - (4- chlorophenyl)-2-ethoxy-acetamidine] according to claim 2 where Ar is 4-chlorophenyl, R is ethyl and polyalkylene is nonamethylene.

References Cited
UNITED STATES PATENTS

| | | | |
|---|---|---|---|
| 2,364,075 | 12/1944 | Hunt et al. | 260—564 |
| 3,105,853 | 10/1963 | McKay et al. | 260—564 |
| 3,472,872 | 10/1969 | Bell | 260—326.15 |

BERNARD HELFIN, Primary Examiner

G. A. SCHWARTZ, Assistant Examiner

U.S. Cl. X.R.

260—239 B, 247.5, 269 R, 294.7 M, 326.84, 326.85, 347.7, 501.12, 501.14, 999

UNITED STATES PATENT OFFICE
CERTIFICATE OF CORRECTION

Patent No. 3,639,478 (S.N. 739,193)   Dated February 1, 1972

Inventor(s) Denis M. Bailey

It is certified that error appears in the above-identified patent and that said Letters Patent are hereby corrected as shown below:

Column 1, in the title, "N,N-ALKYLENEBIS[2-LOWER ALKOXY)" should read -- N,N"-ALKYLENEBIS[2-(LOWER-ALKOXY) --.

Column 1, line 68, "lowre" should read -- lower --.

Column 2, line 31, "isopropxyphenyl" should read -- isopropoxyphenyl --.

Column 2, line 56, " $-CH_2CH_2CHCH_3$ " should read -- $-CH_2CH_2CHCH_3$ --.

Column 3, line 18, "alklyamine" should read -- alkylamine --.

Column 4, line 28, "$(CH(OR))_2$" should read -- $CH(OR)_2$ --.

Column 4, line 38, "compound" should read -- compounds --.

Column 6, line 32, "aboslute" should read -- absolute --.

Column 8, line 29, "Eample" should read -- Example --.

Column 9, line 61, "ether" (first occurrence) should read -- ethyl --.

Column 11, line 55, "acetamine" should read -- acetamide --.

Column 13, line 33, "chlorophenyl)-" should read -- chlorophenyl)-2- --.

Column 14, line 34, "acetimidate-" should read -- acetimidate, --.

Column 14, line 43, "chlorophenyl-2" should read -- chlorophenyl)-2 --.

Column 15, line 35, "phenylaceam-" should read -- phenylacetam- --.

-1-

UNITED STATES PATENT OFFICE
CERTIFICATE OF CORRECTION

Patent No. 3,639,478 (S.N. 739,193)  Dated February 1, 1972

Inventor(s)  Denis M. Bailey

It is certified that error appears in the above-identified patent and that said Letters Patent are hereby corrected as shown below:

Column 15, line 46, "etheral" should read -- ethereal --.

Column 15, lines 62 and 64, "soduim" should read -- sodium --.

Column 16, line 23, "acetamide" should read -- acetamidine --.

Column 17, line 21, "phenylalkyanamidines" should read -- phenylalkanamidines --.

Column 17, line 24, "ethoxyacetimidine" should read -- ethoxyacetimidate --.

Column 17, line 55, "ethly" should read -- ethyl --.

Columns 20-21, lines 75 and 1, respectively, between "The" and "oil" insert -- excess amine was distilled off in vacuo and the remaining --.

Column 21, line 42, "alkanamide" should read -- alkanamidine --.

Column 23, Claim 1, lines 5-9, omit " 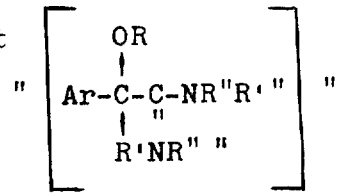 "

and "[I]"; line 12, omit "[II]".

Signed and sealed this 13th day of March 1973.

(SEAL)
Attest:

EDWARD M. FLETCHER, JR.
Attesting Officer

ROBERT GOTTSCHALK
Commissioner of Patents